(12) United States Patent
Colombo et al.

(10) Patent No.: US 10,920,585 B2
(45) Date of Patent: Feb. 16, 2021

(54) DETERMINING SAND-DUNE VELOCITY VARIATIONS

(71) Applicant: Saudi Arabian Oil Company, Dhahran (SA)

(72) Inventors: Daniele Colombo, Dhahran (SA); Gary W. McNeice, Dhahran (SA); Diego Rovetta, Ras Tanura (SA); Ersan Turkoglu, Dhahran (SA); Ernesto Sandoval Curiel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 234 days.

(21) Appl. No.: 15/854,652

(22) Filed: Dec. 26, 2017

(65) Prior Publication Data

US 2019/0195067 A1 Jun. 27, 2019

(51) Int. Cl.
| | |
|---|---|
| *G01V 1/00* | (2006.01) |
| *G01V 1/34* | (2006.01) |
| *G01V 3/165* | (2006.01) |
| *G01V 3/38* | (2006.01) |
| *E21B 49/00* | (2006.01) |
| *G01V 3/10* | (2006.01) |

(Continued)

(52) U.S. Cl.
CPC .............. *E21B 49/00* (2013.01); *G01V 1/003* (2013.01); *G01V 1/303* (2013.01); *G01V 1/34* (2013.01); *G01V 1/36* (2013.01); *G01V 3/10* (2013.01); *G01V 3/165* (2013.01); *G01V 3/38* (2013.01); *G01V 11/00* (2013.01); *G01V 99/005* (2013.01); *G01V 2210/53* (2013.01); *G01V 2210/61* (2013.01)

(58) Field of Classification Search
CPC ........ E21B 49/00; G01V 1/003; G01V 1/303; G01V 1/34; G01V 2210/53; G01V 2210/61; G01V 3/38; G01V 1/282; G01V 1/36; G01V 2210/6222; G01V 1/362
USPC .............. 175/40, 50; 324/207.13; 367/7, 25; 702/2, 11, 14, 16, 18
See application file for complete search history.

(56) References Cited

U.S. PATENT DOCUMENTS

| | | | | |
|---|---|---|---|---|
| 6,289,285 B1 * | 9/2001 | Neff | ........................ | G01V 1/303 702/16 |
| 6,473,696 B1 * | 10/2002 | Onyia | ........................ | G01V 1/32 702/14 |

(Continued)

OTHER PUBLICATIONS

International Search Report and Written Opinion issued in International Application No. PCT/US2018/067021 dated May 2, 2019, 14 pages.

(Continued)

*Primary Examiner* — John E Breene
*Assistant Examiner* — Jeffrey P Aiello
(74) *Attorney, Agent, or Firm* — Fish & Richardson P.C.

(57) ABSTRACT

In some implementations, airborne electromagnetic (AEM) data and seismic data for a geographic region including sand dunes are received, and the AEM data identifies apparent resistivity as a function of depth within the sand dunes. An inversion with cross-domain regularization is calculated of the AEM data and the seismic data to generate a velocity-depth model, and the velocity depth model identifies velocity variations within the sand dunes. A seismic image using the velocity-depth model is generated.

19 Claims, 9 Drawing Sheets
(5 of 9 Drawing Sheet(s) Filed in Color)

(51) Int. Cl.
*G01V 99/00* (2009.01)
*G01V 1/36* (2006.01)
*G01V 1/30* (2006.01)
*G01V 11/00* (2006.01)

(56) References Cited

U.S. PATENT DOCUMENTS

| | | | | |
|---|---|---|---|---|
| 6,868,037 | B2* | 3/2005 | Dasgupta | G01V 1/42 |
| | | | | 367/40 |
| 7,157,914 | B2 | 1/2007 | Morrison et al. | |
| 7,948,237 | B2 | 5/2011 | Kuzmin et al. | |
| 2008/0015780 | A1* | 1/2008 | Dimri | G01V 3/04 |
| | | | | 702/11 |
| 2009/0306900 | A1* | 12/2009 | Jing | G01V 3/083 |
| | | | | 702/13 |
| 2010/0018719 | A1* | 1/2010 | Lu | G01V 3/12 |
| | | | | 166/369 |
| 2011/0060563 | A1* | 3/2011 | Guenther | C10J 3/00 |
| | | | | 703/2 |
| 2011/0317520 | A1* | 12/2011 | Alkhalifah | G01V 1/20 |
| | | | | 367/51 |
| 2014/0277752 | A1* | 9/2014 | Chang | E21B 44/00 |
| | | | | 700/275 |
| 2016/0077228 | A1* | 3/2016 | Hokstad | G01V 1/306 |
| | | | | 702/12 |
| 2016/0084008 | A1* | 3/2016 | Faircloth | E21B 7/14 |
| | | | | 175/16 |
| 2016/0178782 | A1 | 6/2016 | Miles et al. | |
| 2017/0010387 | A1* | 1/2017 | Huang | G01V 1/52 |
| 2017/0153344 | A1* | 6/2017 | Lafet | G01V 1/306 |
| 2018/0203151 | A1* | 7/2018 | Kouchmeshky | G01V 3/26 |

OTHER PUBLICATIONS

Colombo et al., "Seismic-airborne TEM Joint Inversion and Surface Consistent Refraction Analysis: New Technologies for Complex Near Surface Corrections," Society of Petroleum Engineers, Mar. 6, 2017, 15 pages.

Colombo et al., "Near-Surface P-Velocity modelling by integrated seismic, EM, and Gravity Data: Examples from the Middle East," First Break, vol. 26, No. 10, Oct. 2008, 12 pages.

Colombo et al., "High-Resolution velocity modeling by seismic-airborne TEM joint inversion: A new perspective for near-surface characterization," The Leading Edge, 35(11), Nov. 2016, 9 pages.

Colombo et al., "Seismic-airborne TEM joint inversion for near-surface velocity modeling in complex wadi," 86th Annual International Meeting, SEG, Expanded Abstracts, Oct. 2016, 4 pages.

Marquis et al., "3D near-surface velocity model building by joint seismic-airborne EM inversion," 86th Annual International Meeting, SEG, Expanded Abstracts, Oct. 2016, 5 pages.

Gulf Cooperation Council Examination Report issued in GCC Application No. 2018-36737 dated Mar. 24, 2020, 4 pages.

* cited by examiner

DETERMINING SAND-DUNE VELOCITY VARIATIONS

TECHNICAL FIELD

This disclosure relates to handling and processing of seismic data.

BACKGROUND

High dunes occur in vast areas in the Arabian Peninsula that are prospects for oil exploration. Similar high dunes are present in other areas of active oil and gas exploration. Such arid areas include gentle geological structures beneath the dunes, and possible oil traps including small closures: very gentle structures (anticlines) with structural expression of a few tens of meters in the depth domain or a few tens of milliseconds in reflection seismic two-way-time (TWT) domain. Uncorrected dune effects cause false structures in seismic images that can be erroneously drilled in search of hydrocarbons. These false images are the same size (or bigger) than the structural expression of the searched prospects.

SUMMARY

In some implementations, airborne electromagnetic (AEM) data and seismic data for a geographic region, including sand dunes, are received, and the AEM data identifies apparent resistivity as a function of depth within the sand dunes. An inversion with cross-domain regularization is executed using the AEM data and the seismic data to generate a velocity-depth model, and the velocity-depth model identifies velocity variations within the sand dunes. A seismic image using the velocity-depth model is generated.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more embodiments of the implementation are set forth in the accompanying drawings and the description. Other features, objects, and advantages of the implementations will be apparent from the description, the claims, and the accompanying drawings.

DESCRIPTION OF DRAWINGS

The patent or application file contains at least one drawing executed in color. Copies of this patent or patent application publication with color drawing(s) will be provided by the Patent and Trademark Office upon request and payment of the necessary fee.

Like reference numbers and designations in the various drawings indicate like elements.

DETAILED DESCRIPTION

Figure 1:
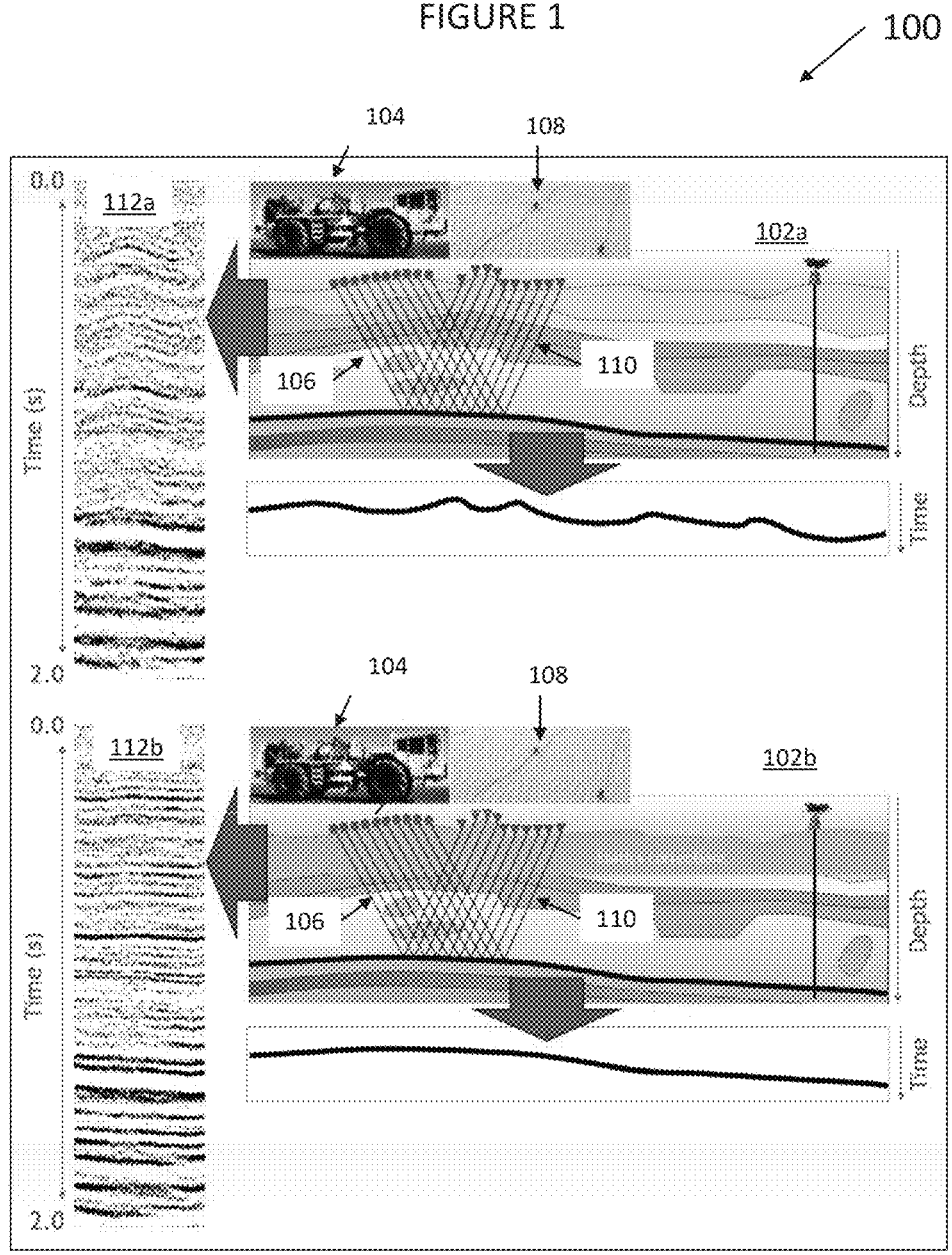
FIG. 1 is an example schematic illustrating effects of dunes and near-surface complexities on TWT images of deep reflectors, according to some implementations.

The following description is presented to enable any person skilled in the art to make and use the disclosed subject matter, and is provided in the context of one or more particular implementations. Various modifications to the disclosed implementations will be readily apparent to those skilled in the art, and the general principles defined in this disclosure may be applied to other implementations and applications without departing from scope of the disclosure. Thus, the present disclosure is not intended to be limited to the described or illustrated implementations, but is to be accorded the widest scope consistent with the principles and features disclosed in this disclosure.

This disclosure is directed to using AEM methods in time or frequency domains to measure variations in apparent resistivity within and below sand dunes and determining velocity variations using the apparent resistivity and seismic data. For example, the apparent resistivity can be mapped into velocity variations through an inversion process of seismic and electromagnetic data where cross-domain regularization in the model space is used. By using AEM methods, false structures in seismic images can be eliminated or otherwise reduced as compared with conventional seismic approaches such as using seismic vibrators. As a result of eliminating or reducing false structures, the risk of erroneously drilling in search of hydrocarbon can be reduced.

In the present disclosure, seismic velocities in dune areas are determined using electromagnetic and seismic data, which are suited for deserts with sand dunes as discussed later. In some implementations, electromagnetic methods in time or frequency domains can be used to accurately measure apparent-resistivity variations within and below the dunes. In these instances, the measure of apparent-resistivity variations can be mapped into velocity variations through an inversion process of seismic and electromagnetic data. In addition, cross-domain regularization can be used in the model space. The cross-domain regularization is based on a measure of similarity between one or more models determined using advanced statistical methods such as cross-correlation, linear or non-linear regression, and cluster analysis, which really on mathematics higher than arithmetic. The inversion process minimizes a composite objective function based on at least the data-objective function and one or multiple cross-domain regularization objective functions. The composite objective function can be minimized or otherwise reduced below a predefined threshold using a variety of well-known linear algebra or global optimization methods, which can depend on the characteristics of the specific inversion problem.

In some implementations, apparent-resistivity variations can be determined using AEM. Other electromagnetics methods can be used without departing from the scope of the disclosure. AEM systems transmit an electromagnetic signal from a system attached to a plane or helicopter. The signal induces eddy currents in the ground which are detected by receiver coils towed below and behind the aircraft in a device called a bird. Depending on the system used and the subsurface conditions, AEM techniques can detect variations in the apparent resistivity of the ground to a depth of several hundred meters. AEM and seismic travel times (or waveforms) can be combined to determine seismic velocities in dune areas. Acquisition can be fast such as several measures per second, and spatial sampling can be dense, such as one point every few meters. In some implementations, exploration depth can cover from a few meters to a few hundred meters from the surface. AEM can incorporate various airborne systems such as helicopters or fixed-wing aircraft to fly at low elevation, such as 30-40 meters, and low speed, such as 85 knots, over vast areas, such as hundreds of square kilometers (km), within a shorter time period as compared with conventional approaches in desert areas.

Airborne systems can fly over seismic receiver lines on top of the dunes. These areas are undersampled in seismic-acquisition systems due to the difficulty of the seismic vibrators ability to reach the top of the dunes. Desert areas are typically not inhabited and have few, if any, infrastructures and trees. This facilitates the use of AEM methods where flight directions can be maintained and systems can be flown at low elevation. Data quality can be excellent with large depth of penetration because dry sands have a high resistivity and shallow environment and the high resistivity sharply contrasts with low resistivity of the base of sand (BOS), which is the bottom of sand dunes. AEM systems can be generally described as frequency-domain or time-domain systems with a single-frequency pulse or multi-frequency pulse. The depth penetration can be adjusted based on one or more parameters, such as regulating frequency, turn-off time, source wavelet, current moment, or listening time. The AEM systems can acquire more data than conventional systems over the dunes with few or no logistical limitations to provide, through inversion of the apparent-resistivity distribution within the dune, time-domain or depth-domain images, and the transition with the base of sand (BOS).

The BOS is typically conductive such as in the case of sabkhas. The rare rains can drain wind-blown substances from the surface and deposit them in the low permeable plains between the dunes and at their base. The BOS is a good target for AEM methods because of the structure transitions from a large resistor (dry sands) to a good conductor (sabkhas/BOS). In addition, the transition is also an interface for a large seismic velocity contrast. In addition to this, the AEM systems provide the information of the apparent-resistivity variations within the dunes which is then correlated to velocity variations. These measurements are used in modeling the parameter distributions within the dunes where a statistical relation is used to derive seismic velocities from the distribution of resistivity obtained by AEM methods. As previous mentioned, the statistical relation can be based on cross-correlation, linear or non-linear regression, cluster analysis, or other methods involving supervised and unsupervised statistics and deep learning methods.

FIG. 1 illustrates an example schematic 100 illustrating the effects of dunes and near-surface complexities on TWT images of deep reflectors. In general, the topography and the low velocity of the loose sand as compared with compact sediment can introduce time distortions in seismic exploration in high dune areas. The correct reconstruction (imaging) of deep structures in TWT images or in the depth domain can depend on the accuracy by which the dune corrections are performed to a reference plane used for seismic processing (processing datum). In fact, while the elevation of the dunes relative to the processing datum is a known parameter, the velocity to be applied to calculate the corresponding time delay (static) can be an unknown parameter. Errors in the determination of such variable velocities within the dunes cause significant distortions that can be interpreted as potential drilling targets.

As illustrated, the schematic 100 includes a first schematic 102a illustrating not correcting near-surface anomalies and a second schematic 102b illustrating correcting near-surface anomalies. The first schematic 102a and the second schematic 102b include a vibrator 104 that generates seismic waves 106 and a geophone 108 that detects and records reflected waves 110. Other seismic-wave generators and receivers may be used without departing from the scope of the disclosure. Seismic stacks 112a and 112b are generated based on the recorded reflected waves 110. The seismic stack 112a illustrates the impact of the near-surface complexities. As previously mentioned, an inaccurate seismic velocity distribution can produce the false structures in a seismic stack. The apparent resistivity can be detected using electromagnetic systems and mapped to variable velocities in sand dunes. The seismic stack 112b is generated using the variable velocities and illustrates the effect of removing or otherwise reducing the impact of the near-surface complexities. As a result, the seismic stack 112b illustrates a corrected image in time or depth domain based on an accurate description of the seismic velocity distribution within the sand dunes.

Robust velocity determinations are difficult to obtain with conventional seismic approaches, as sand dunes are typically undersampled by seismic data. Frequently, seismic vibrators (seismic sources) are unable to produce seismic waves that reach the top of high dunes where only receivers are located. In addition, loose sands can also provide poor coupling with the seismic receivers resulting in noisy seismic data. These problems can result in poor static corrections with the generation of false structures remaining in the seismic images.

Figure 2:
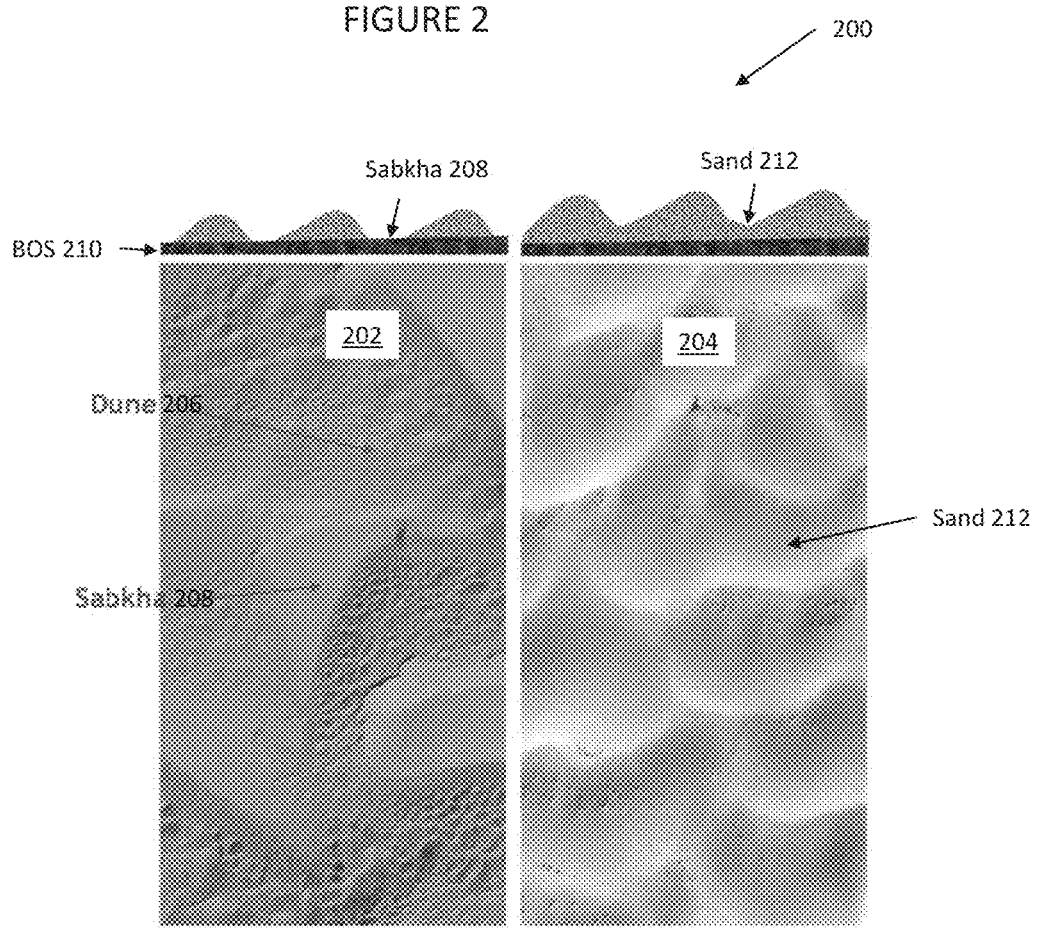
FIG. 2 illustrates two examples of sand dune morphology including interspaces between dunes covered by and not covered by sand, according to some implementations.

FIG. 2 illustrates a schematic 200 illustrating a first morphology 202 and a second morphology 204. The first morphology 202 illustrates dunes 206 intercalated by plains or sabkhas 208 defining the BOS 210, and the second morphology 204 illustrates sand 212 between dunes that prevents the BOS 210 from being defined. In the case of the second morphology 204, the sharp velocity discontinuity cannot be determined with seismic data alone and, as a result, near surface corrections cannot be correctly determined such as from a few meters to a few hundred meters.

In some implementations, static corrections for dunes can be determined using experimental travel time curves (sand dune curves) that are derived empirically for the specific sand lithology characterizing the survey area. This approach is based on experimental analysis of compaction of sands and is successful for some morphologies, such as the first morphology 202. The surface representing the bedrock below the dunes is identified and can be used as processing datum to refer the time corrections calculated from the sand dune curve. As previously mentioned, this procedure can be valid and obtain success when the BOS 210 can be identified, such as in the first morphology 202. The elevation of the sabkhas plains can be interpolated together to generate the BOS surface to determine where to apply the sand-curve correction. The transition between the dunes and the sabkhas represents a sharp velocity change: from sands to compacted sediments below. As previously mentioned, velocities are lower in the sands compared to velocities in the compact sediment. The velocity transition can be as large as 2,000 meters per second (m/s) or more in a narrow depth interval. When the sabkhas 208 are exposed in between the dunes 206, such as in the first morphology 202, the surface delimiting the sharp velocity transition can be defined deterministically. When the space in between the dunes is also covered by sand 212, such as in the second morphology 204, the morphology of the sharp velocity discontinuity may not be determinable. In the first case, the sand curve provides acceptable results (with small residual error). While, in the second case, the sand curve correction cannot be applied deterministically as the depth of the transition to the BOS 210 is not known. This leaves ample margins of error in performing the corrections with increased risks for prospect generation.

Figure 3:
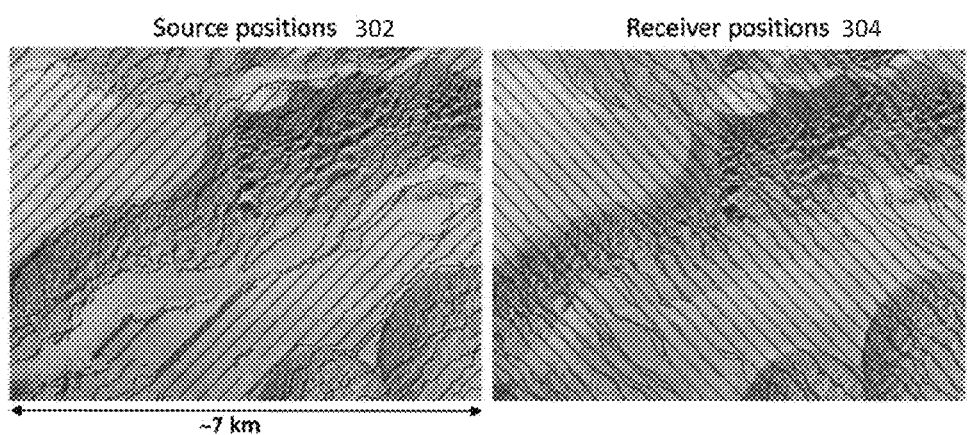
FIG. 3 illustrates example source positions and received positions for sampling of dunes, according to some implementations.

FIG. 3 illustrates a schematic using convention approaches for defining the velocity in the near surface. The BOS is drilled with shallow boreholes and performing checkshot surveys (or upholes) to directly measure the travel time from the surface to different depths in the borehole. The example schematic 300 illustrates source positions 302 and receiver positions 304 for sampling provided by a typical 3D seismic acquisition. As illustrated, several gaps are present in the distribution of the seismic sources. While the upholes can provide velocity profiles that can be used for near surface corrections, the drilling of several boreholes at a regular spatial sampling is costly and has slow production rates. In short, a typical three-dimensional (3D) seismic acquisition can include several gaps and is costly.

Figure 4:
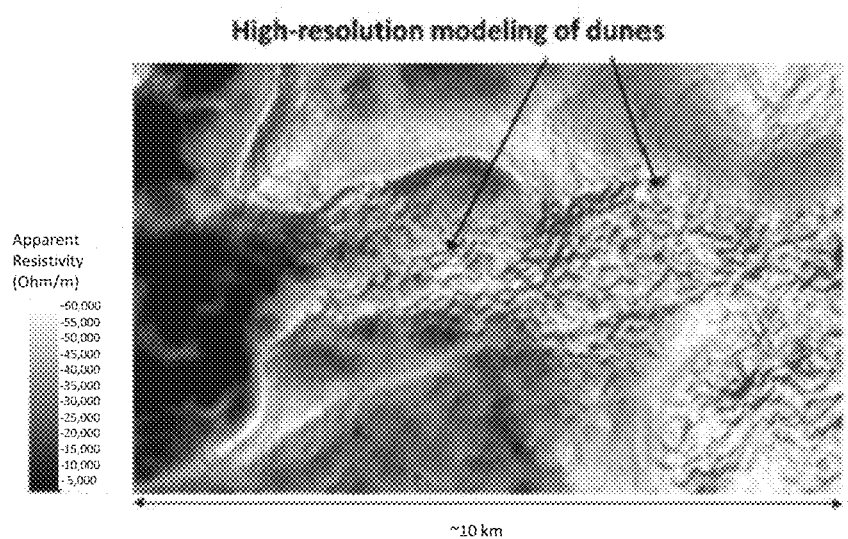
FIG. 4 illustrates apparent resistivity in high-resolution modeling of dunes, according to some implementations.
Figure 5:
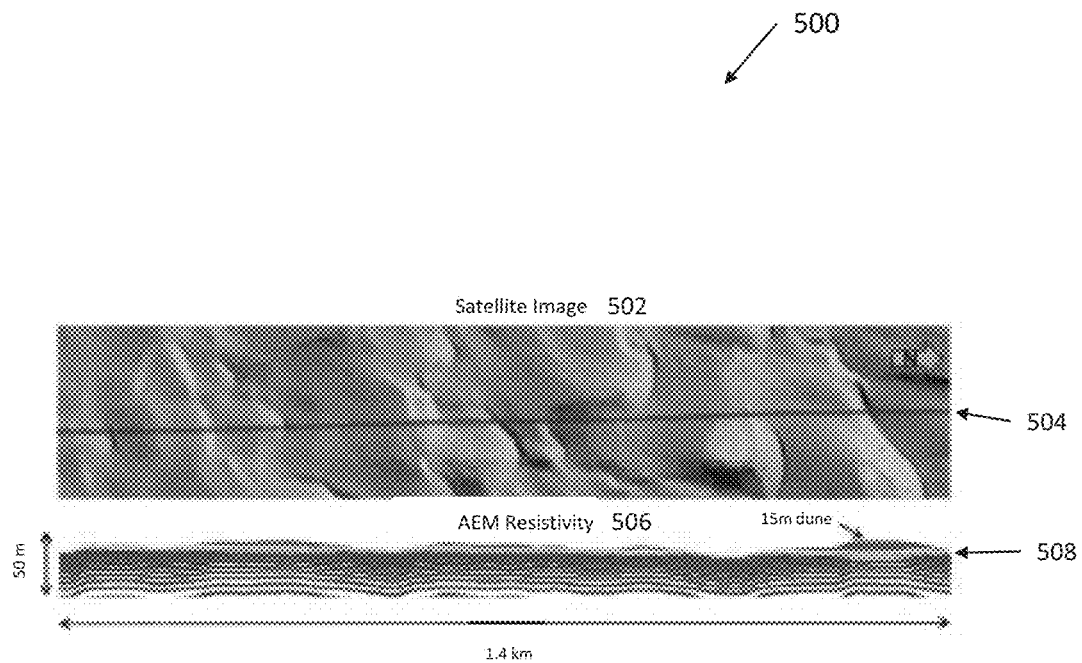
FIG. 5 illustrates a flight line for an AEM system and apparent resistivity along the flight line and in the depth dimension, according to some implementations.

FIG. 4 illustrates an image 400 of the apparent resistivity mapped over a sand dune area. The apparent resistivity is derived from a transform of acquired AEM data. As illustrated, the image 400 shows the details of the dune internal resistivity variations that can be mapped by an AEM system. Prior to mapping the apparent resistivity, AEM data needs to be collected. FIG. 5 illustrates a satellite image 502 and a flight path 504 for acquiring AEM data. The flight path 504 illustrates a short profile along a N-S crossline direction over the dune field. After inversion of AEM data, the AEM resistivity 506 is plotted and provides sharp details of the position of the BOS 508. In this instance, the BOS 508 is sharply identified by the resistivity variation with a vertical resolution in the order of a few meters in the depth dimension. When solely using 3D-acquisition systems, this interface is out of reach for seismic acquisition and processing systems because of the problem described: poor spatial sampling and low signal-to-noise of the seismic data.

Figure 6:
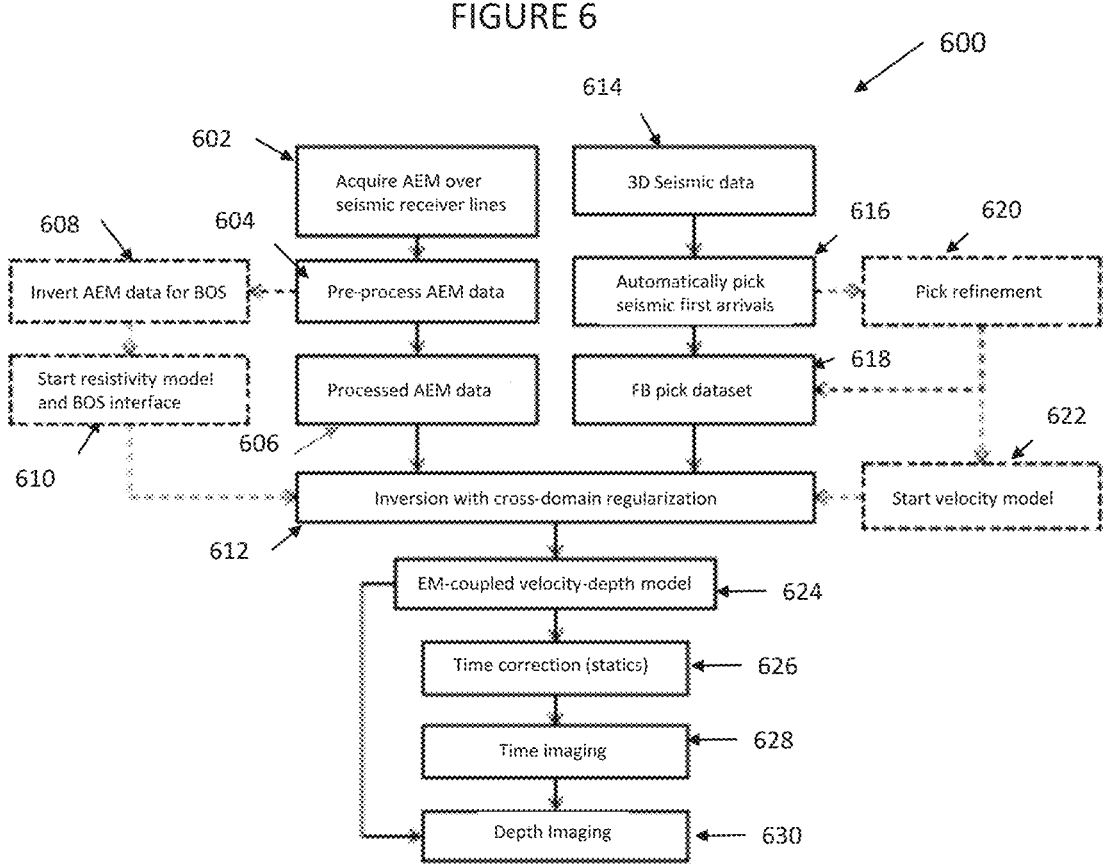
FIG. 6 is a flowchart illustrating an example AEM-seismic method for velocity-depth modeling of sand dunes, according to some implementations.

FIG. 6 is a flowchart illustrating an example method 600 for determining velocity-depth models. For clarity of presentation, the description that follows generally describes the method 600 in the context of FIGS. 1-5. However, it will be understood that the method 600 may be performed, for example, by any other suitable system, environment, software, and hardware, or a combination of systems, environments, software, and hardware, as appropriate. In some cases, the method 600 can be executed on large scale computer clusters, super computers, or any other computing device or collection of computing devices. In some implementations, various steps of method 600 can be run in parallel, in combination, in loops, or in any order.

The method 600 starts at step 602 where AEM data is acquired over the seismic receiver lines across the dunes that are inaccessible by the seismic vibrators as described with respect to FIG. 3. The AEM data undergo, at step 604, pre-processing (described later) to obtain, at step 606, a processed AEM dataset ready for inversion. Optionally, the AEM dataset can, at step 608, be inverted separately to generate a resistivity model that can be used to infer the BOS interface as depicted by FIG. 5. Both the start resistivity model and the BOS interface are prepared, at step 610, to be used in the successive step of inversion with cross-domain regularization at step 612 (described later). The distribution of resistivity inside the model is derived via inversion of the AEM data, where inversion can be one, two, or three dimensional. The BOS interface is obtained by tracking, which can be an automated method, the sharp gradient in resistivity between the dunes and the substratum below the BOS.

The 3D seismic data is acquired at step 614 and is used, at step 616, to automatically pick the first arrival travel times: first breaks (FB). The arrival times are stored as a FB pick dataset. Optionally, the seismic FB dataset can undergo a process of statistical refinement at step 620 to generate a refined FB dataset ready for inversion. The statistical refinement is a quality-control process involving sorting in midpoint-offset domain, calculation of statistics, and rejection of outliers, such as the refinement disclosed in U.S. patent application Ser. No. 15/361,671, which is incorporated by reference. After refinement, the same FB dataset can be used to generate, at step 622, a start velocity model ready for inversion based on common midpoint (CMP)-velocity (the details of these processes are described later). At step 612, the inversion with cross-domain regularization is executed where the seismic and AEM datasets are inverted. The inversion process can be of various forms including dimensionality (one-dimensional (1D), two-dimensional (2D), 3D), simultaneous for the AEM and seismic datasets, hierarchical such as cascading one after the other, or hierarchical by fixing one domain such as one domain is inverted subject to the cross-regularization of the other domain. The optionally derived BOS can be used to further regularize the inversion as it will be described later. The start models of AEM and seismic can be used if the inversion will be based on a linearization process. The result of the inversion is an EM-coupled velocity-depth model at step 624 that is used for a number of successive operations (not necessarily sequential), such as time corrections at step 626 (statics calculation), application of statics for time-domain imaging at step 628, and use of time corrections and velocity-depth model for depth imaging at step 630. The key steps of the workflow are further detailed in the next paragraphs. In some implementations, the results can be communicated for drilling a wellbore. For example, communication can include drilling to the specification based upon the image, like the geographical location, the depth, the design of well, and whether to approach the hydrocarbon-bearing location using a vertical, deviated or horizontal well.

In general, AEM systems, whether in time or frequency domain, are used to measure the time-varying decay of the secondary magnetic field generated as a response to the primary source signal or the attenuation rate and distortions of the frequency-domain source signal. Typically, the AEM systems are capable of providing information of the subsurface from a few meters from the topography to several hundred meters based on one or more parameters. The parameters can include at least of the type of system used, the source strength, frequency and time windows of the transmitted and received signal, the conductivity structure of the earth, or the height and speed of the flight. The dynamic range of such systems is typically broad and allows information to be gathered from the shallow section (sub resolution for seismic data at the commercial acquisition layouts) to a depth of a few hundred meters where the near surface effects due to weathering, karsting, and sand dunes are no longer present or substantially reduced. Conversion of the measured field units to electrical resistivity as a function of depth is a regularized inversion process.

In areas with sand dunes, the prime target is to image the underlying lower resistivity geology, such as sabkhas or BOS, with an AEM system that penetrates through the dunes. Acquired raw AEM data can be checked automatically for coupling with manmade electromagnetic (EM) sources, which can be noise sources, and the coupled data can be removed semi automatically using filters based on decay rate of secondary magnetic fields and adjusted for the area under investigation. Raw AEM data are typically recorded with significant redundancy with measurements every few meters. In a time-domain system, signal-to-noise ratio can be significantly improved for the longer decay windows by a skin depth adaptive spatial stacking method, which is describe in more detail later. The skin depth for electromagnetic waves expresses the distance by which the EM fields decay by l/e, which is one divided by Euler's number. This distance is inversely proportional to frequency and directly proportional to the resistivity of the subsurface. Sand dunes typically provide an ideal scenario as the high resistivity of the dry sands allow the EM fields to propagate deep into the subsurface and provide information of the internal dune structures and of the transition to the more conductive base (BOS).

In a time-domain AEM system, the electromagnetic skin depth is used as a guide to determine the width of the stacking length for each decay time window. The shape of the stacking cone can be scaled further with an exponential multiplicative increasing from early decay windows to later decay windows to keep the shallow detail intact while longer decay windows are stacked over several hundreds of meters spatially.

In some implementations, inversion of the AEM data can use a skin depth adaptive conical shaped regularization operator. The shape of the cone can be adjusted every iteration using the skin-depth phenomenon where alternating current (AC) flow mostly near the outer surface of an electrical conductor. Regularization operator can also use inversion sensitivity matrix to define the weighting of the regularization. EM inversions are inherently non-unique so that more than one model can fit the data nearly equally. To overcome the equivalence of different resistivity models, EM inversion are regularized. A good start model is a key factor to reduce the non-uniqueness especially when investigating the base of dunes. An automated search for optimum start model resistivity for this purpose is carried out by minimizing or otherwise reducing the structure under the dunes. This approach can yield a resistivity start model close to the resistivity of the dunes.

In some implementations, spatial regularization can be used to obtain a spatially consistent inversion model and also used to eliminate imprint of the possible acquisition footprint or bias into the final resistivity model. The 3D size of the regularization operator can be fixed in all or a subset of dimensions and for all or a subset of depths. The regularization operator can change the size based on the skin depth. In some cases, the regularization operator can be scaled using the inversion sensitivity so that model parameters with higher sensitivity have higher influence on the regularization (for example, time domain AEM is more sensitive to conductors).

In some implementations, the start resistivity model can be one dimensional (1D), two dimensional (2D), or three dimensional (3D). Sand dunes can be expected to have a relatively flat base. Regularized and smooth nature of the EM inversion tends to find undulant base of sand as the thickness and the resistivity of the dunes cannot be determined independently. Therefore, a search through viable resistivity model alternatives can be performed. The final models from each inversion run can be cross-checked for the most consistent features, and a structural complexity test can be performed to choose the least structure for the shallow subsurface.

Uncertainties may occur while picking first breaks from seismic data. These variations can be mitigated or otherwise reduced utilizing statistical measurements, such as the average and the standard deviation of a specific set of picks to remove outliers and to guide an automatic re-picking of the data in a successive iteration.

Typically, this successive iteration can remove most outliers when these variations behave as a Gaussian distribution within a bin of spatial source and receiver mid points and range of offsets, but sometimes further work related to the physics of propagation of seismic waves aids the precise location to be used as a seed in the additional re-picking work. The latter usually takes place in areas where seismic data suffers from shingling caused by velocity inversions in the near surface.

After obtaining robust estimates of the seismic first arrivals, these estimates are sorted once more into bins of common source-receiver mid points and offset, and their statistical average can be evaluated versus offset to perform a 1D conversion from the specific offset-time functions to depth-velocity functions. This conversion can be a constrained cubic spline fit (where the velocity should increase as the depth increases) and that intentionally disregards velocity inversions in the near surface. After interpolation, the result can be a pseudo-3D velocity model which represents a smooth envelope of the actual velocities of the near surface. In addition, the result can be used for the next step of seismic-AEM inversion with cross-domain regularization.

The following inversion algorithm is based on minimizing or otherwise reducing a total objective function composed of a model regularization function, a data misfit, and two cross-domain operators, acting as additional regularization. Other inversion algorithms can be performed without departing from the scope of the disclosure.

In the described implementation, a multi-physics inversion algorithm with inter-domain regularization is implemented, which is an example of step 612. The model space is represented with a vector $m=[m_1, m_2, \ldots, m_M]$, where $m_1, m_2, \ldots, m_M$ are models from different geophysical domains, and the data space is represented with a vector $d=[d_1, d_2, \ldots, d_N]$, where $d_1, d_2, \ldots, d_N$ are data of different geophysical measurements. For example, in FIG. 6, the processed AEM data and the FB pick dataset are inverted for the velocity model and the resistivity model. Therefore, N=2, $d_1$ is the processed AEM data, $d_2$ is the FB pick dataset, $d=[d_1, d_2]$, M=2, $m_1$ is the velocity model, $m_2$ is the resistivity model, and $m=[m_1, m_2]$. In general, N datasets can be inverted to solve M unknown models.

The inversion algorithm is formulated such as a constrained least squares problem solved by minimizing or otherwise reducing below a specified threshold, a total objective function composed of a model regularization function, a data misfit, and two cross-domain operators, acting as additional regularizers:

$$\phi_t(m) = \phi_d(m) + \frac{1}{\lambda_1}\phi_m(m) + \frac{1}{\lambda_2}\phi_x(m) + \frac{1}{\lambda_3}\phi_{rp}(m) \quad (1)$$

where $\lambda_1, \ldots, \lambda_3$ are Lagrange multipliers, or the inverse of the misfit weights, $$\mu_1 = \frac{1}{\lambda_1}, \ldots, \mu_3 = \frac{1}{\lambda_3}.$$

In some cases, the Lagrange multipliers can be chosen as fixed values or changed with the inversion iterations. For example, the Lagrange multipliers can be slowly reduced with the inversion iterations based on a decreasing exponential law.

The data misfit is defined as:

$$\phi_d(m) = (Jm - d_{obs})^T W_d^T W_d (Jm - d_{obs}) = \|W_d(Jm - d_{obs})\|_{L_2}^2 \quad (2)$$

where $d_{obs}$ is the vector of the observed data, J is the Jacobian or the sensitivity matrix, and $W_d$ is a data weighting (or covariance) matrix taking into account the relative importance of the observations, the modelling errors and the effect of the noise in the data.

The model regularization function $\phi_m(m)$ is defined as:

$$\phi_m(m) = (m - m_0)^T W_m^T W_m (m - m_0) = \|W_m(m - m_0)\|_{L_2}^2 \quad (3)$$

where $m_0$ is the prior model and $W_m$ is a model weighting (or covariance) matrix including spatially dependent weighting functions, model smoothing operators and prior information on the model. In some cases, the prior model $m_0$ includes available a priori information for the specific model, and the model weighting matrix $W_m$ includes assumed uncertainties on the prior model. If a prior information is not available, geologic knowledge, information from previous inversions, or a "standard model" can be used. For example, $m_0$ can be a velocity gradient decreasing model with depth and $W_m$ an identity matrix. In some cases, the start resistivity model at 610 and the start velocity model at 622 can be used for the prior model $m_0$ in the first iteration of the inversion.

The structural cross-domain regularizer $\phi_x(m)$ is the misfit:

$$\phi_x(m) = \sum_{i=1}^{M} \sum_{j=i+1}^{M} \sum_{k=1}^{K} w_{i,j,k} |sc_k(m_i, m_j)|^2 \quad (4)$$

$$= \sum_{i=1}^{M} \sum_{j=i+1}^{M} \sum_{k=1}^{K} w_{i,j,k} x_{i,j,k}^2$$

$$= \sum_{i=1}^{M} \sum_{j=i+1}^{M} x_{i,j}^T W_{x,i,j}^T W_{x,i,j} x_{i,j}$$

$$= \sum_{i=1}^{M} \sum_{j=i+1}^{M} \|W_{x,i,j} x_{i,j}\|_{L_2}^2 = \|W_x x\|_{L_2}^2$$

where $m_i$ and $m_j$ are two different geophysical models (over a total of M) whose properties are defined over a 3D grid of K cells; $sc_k(m_i, m_j)$ is a structural constrain vector, such as, for example, cross-correlation or other measure of similarity, between the two models $m_i$ and $m_j$ at the grid cell k; $x_{i,j,k} = |sc_k(m_i, m_j)|$; $w_{i,j,k}$ is the weight given to $x_{i,j,k}$; $x_{i,j}$ and $W_{x,i,j}$ are, respectively, the total structural constrain vector and covariance matrix between the two models $m_i$ and $m_j$. In some cases, the structural weight $w_{i,j,k}$ can be a fixed value or changed with the inversion iterations. For example, $w_{i,j,k}$ can be slowly reduced with the inversion iterations based on a decreasing exponential law. The structural constraint vector $sc_k(m_i, m_j)$ can be calculated based on cross-correlation approaches, such as approaches based on cross-gradients or summative gradients, or other measure of similarity. We can also make use of unsupervised learning methods such as cluster analysis techniques dealing also with AI such as deep learning, pattern recognition, etc.

In the case of cross-gradients, the structural constraint is evaluated as the cross-product of the spatial gradients of the two models $m_i$ and $m_j$ for each cell k:

$$sc_k(m_i, m_j) = \nabla m_i \times \nabla m_j \quad (5)$$

The module of such a vector is minimum and zero when the two gradients have the same direction; therefore, we can enforce structural similarity between the two models $m_i$ and $m_{i+1}$ in the joint inversion by minimizing the module of (5) in the least square sense for all the K cells of the grid in (4). A disadvantage of this constraint is that the module of the cross-gradients is zero also when one of the two gradients is zero, which is by definition when one of the two models is constant. The structural objective function becomes multimodal and the inversion process instable. In order to avoid this non desirable behavior the signed summative gradients structural constraint can be considered:

$$sc_k(m_i, m_j) = \frac{\nabla m_i}{\sqrt{|\nabla m_i|^2 + \varepsilon^2}} + h \frac{\nabla m_j}{\sqrt{|\nabla m_j|^2 + \varepsilon^2}} \quad (6)$$

$h = \pm 1$ is the correlation sign. When $h = -1$ we are assuming that $m_i$ and $m_j$ are positively correlated; negatively correlated when $h = 1$. The denominators in (6) are introduce to normalize the different values of the two gradients and E is a small constant to avoid zeros (damping). In this case, the module of the structural constrain vector is zero when the two normalized gradients have the same (for positive correlation) or opposite (for negative correlation) value. It is important to understand that in this case, when one of the two models is constant, the constraint is not zero; however, it is zero if both the models are constant. The behavior of this constraint in the joint inversion is more stable, but it makes the strong assumption that we always know the type of correlation of the models everywhere.

The different geophysical domains can also be related through physical relations or empirical ones, obtained by direct observations, as well as log measurements fitted, for example, with regressions functions (e.g., nonlinear, multiple regression, multivariate), or based on "supervised learning" techniques. Therefore, the physical properties of two geophysical models $m_i$ and $m_j$ can be related using a non-linear function $f_p$:

$$\hat{m}_j = f_p(m_i),  \quad (7)$$

where $\hat{m}_j$ is an estimate of the model $m_j$. $f_p$ can be any function mapping a geophysical model $m_i$ into another geophysical model $m_j$; for example, a typical function widely utilized in the industry to relate P-wave velocity V to density ρ is represented by the Gardner's rule, which is a power-law function of the type $\rho = \alpha V^\beta$ where the coefficients α and β can vary depending on the lithology and on the depth of burial and saturation conditions.

The property cross-domain regularizer $\phi_p(m)$ is the misfit:

$$\phi_p(m) = \sum_{i=1}^{M} \sum_{j=i+1}^{M} \sum_{k=1}^{K} v_{i,j,k} |pc_k(m_i, m_j)|^2 \quad (8)$$
$$= \sum_{i=1}^{M} \sum_{j=i+1}^{M} \sum_{k=1}^{K} v_{i,j,k} p_{i,j,k}^2$$
$$= \sum_{i=1}^{M} \sum_{j=i+1}^{M} p_{i,j}^T X_{p,i,j}^T W_{p,i,j} p_{i,j}$$
$$= \sum_{i=1}^{M} \sum_{j=i+1}^{M} \|W_{p,i,j} p_{i,j}\|_{L_2}^2 = \|W_p P\|_{L_2}^2$$

where $m_i$ and $m_j$ are two different geophysical models (over a total of M) whose properties are defined over a 3D grid of K cells; $pc_k(m_i, n_j) = \hat{m}_{k,j} - m_{k,j}$ is a property constrain difference between the two models at the grid cell k; $p_{i,j,k} = |pc_k(m_i,m_j)|$; $v_{i,j,k}$ is the weight given to $p_{i,j,k}$; $p_{i,j}$ and $W_{p,i,j}$ are, respectively, the total property constrain vector and covariance matrix between the two models $m_i$ and $m_j$. The weight $v_{i,j,k}$ can be a fixed value or changed with the inversion iterations. For example, $v_{i,j,k}$ can be slowly reduced with the inversion iterations based on a decreasing exponential law. The term $m_{k,j}$ is the actual value of the model $m_j$ at the cell k of the common grid. The term $\hat{m}_{k,j}$ is the assumed value of the model $m_j$ at the cell k of the common grid as calculated by the physical relation $f_p$ as a function of the model $m_i$ at the cell k of the common grid (for example, using equation (7)).

The previous expressions of the cross-domain regularizers are valid only if the models $m_i$ and $m_j$ are defined on a common grid. However, we also extended this concept to general models on different grids by calculating an interpolation when calculating the structural constraint and its sensitivity matrix.

The minimization of the total objective function described in equation (1) can be obtained with different techniques. For example, the total objective function can spread from local optimizers (steepest descent, conjugate gradients, Gauss-Newton, limited-memory Broyden-Fletcher-Goldfarb-Reeves (LBFGS), or others) to global optimizers (neural networks, genetic algorithms, simulated annealing, or others), depending on the complexity and cardinalities of the specific inverse problem.

An additional nonlinear transformation n=l(m) is applied to each geophysical model to constrain the new solution n to be confined into the physical bounds [$m_L$ $m_H$], where l can be chosen as $$n = l(m) = \frac{m_H - m_L}{1 + e^{-m}} + m_L \quad (9)$$

So that when m→+∞, n→$m_H$ and when m→−∞, n→$m_L$.
The inverse $l^{-1}$ is given by:

$$m = l^{-1}(n) = -\mathrm{Log}\left(\frac{m_H - n}{n - m_L}\right) \quad (10)$$

After a linearization of $l^{-1}$ the following is obtain:

$$\delta m = L^{-1} \delta n \quad (11)$$

$$\delta d = J \delta m = JL^{-1} \delta n \quad (12)$$

The bounded solution is therefore given by substituting m with n and J with $JL^{-1}$ in the equations (1-8). Bounded inversion can also be obtained by acting on the model covariance matrix. In some implementations, equations (1)-(8) are used to determine an unbounded solution (without imposing maximum and minimum values in the estimated models). For determining a bounded solution (assuming the maximum and minimum values of the unknown models are known), equations (9)-(12) are substituted into (1)-(8) to solve for n instead that for m.

Another useful feature of the inversion with cross-domain regularization method is the capability of defining any portion of the 3D model where the corresponding parameters can be constrained. We can therefore define 3D spatially-varying filters to define regions of the model where parameters can be locked or the amount of update can be controlled, the filters can define spatially-varying upper-lower bounds for the parameters during inversion, and subspaces can be defined to apply the inter-domain regularization only in some specific regions of the model.

Figure 7:
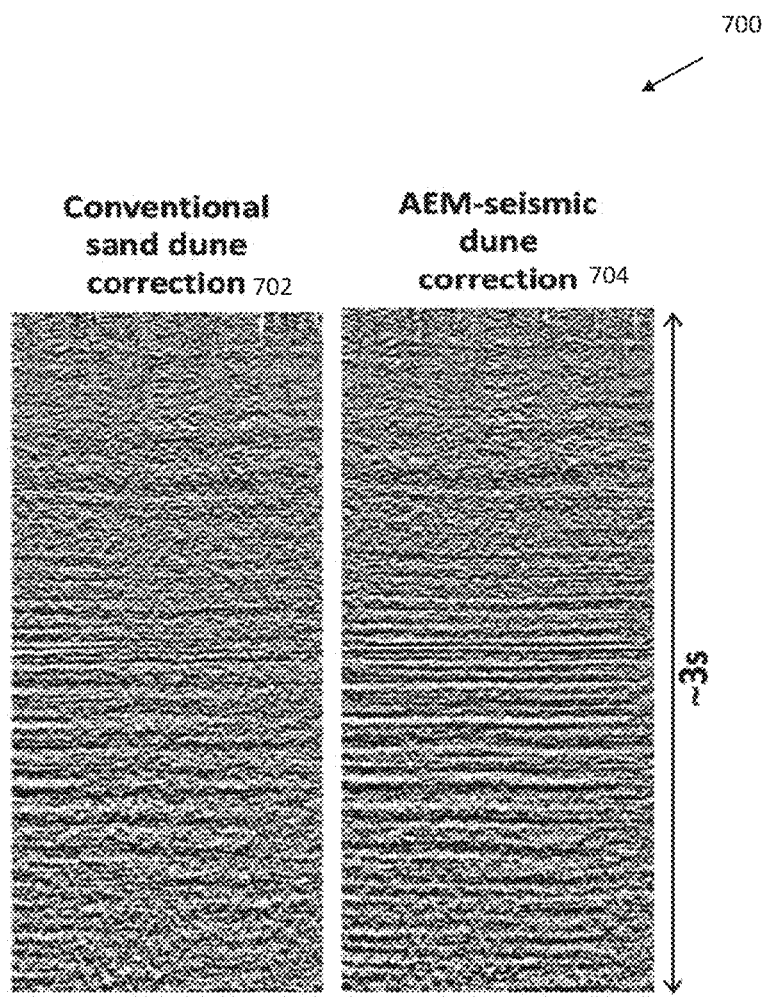
FIG. 7 illustrates results in time-domain comparison of conventional sand-dune correction and AEM-seismic dune correction, according to some implementations.
Figure 8:
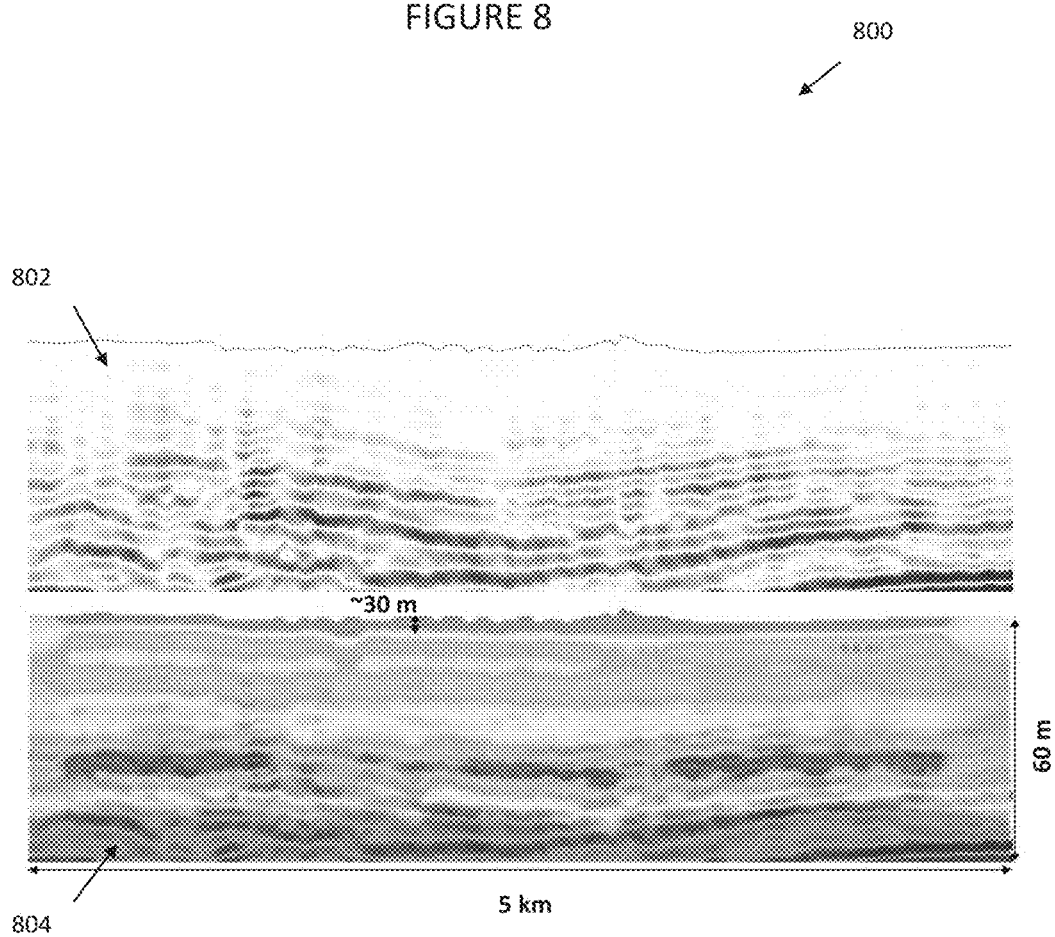
FIG. 8 illustrates a pre-stack depth migration (PSDM) seismic image and AEM resistivity along the flight line and in-depth, according to some implementations.

FIGS. 7 and 8 illustrate an example time-domain comparison 700 and an example depth-domain results 800, respectively. The EM-coupled velocity-depth model deriving from the application of the inversion procedure with cross-domain regularization is used for enhancing seismic imaging in both time and depth domains (Pre-Stack Time or Depth: PSTM or PSDM). In the time domain, the sand dune velocities are used to calculate time shifts to a processing datum to remove the effects of the dunes in the near surface (as described in FIG. 1). The time-domain comparison 700 includes conventional results 702 and AEM results 704. In the conventional results 702, the conventional sand dune correction is determined relative to a procedure of dune correction through time-shift calculation (statics). The AEM-seismic derived time corrections (from the corresponding velocity model) show the image reflected events are sharper in time domain as illustrated the AEM results 704 relative to the conventional results 702.

In the PSDM, the migration uses both time corrections and the velocity-depth model to image the seismic data. The results 800 include a PSDM seismic image 802 and AEM resistivity 804. The PSDM seismic image 802 is determined where the AEM-derived model is used for calculating time corrections (as per FIG. 7) and a portion of the velocity is additionally used to migrate the data. The resistivity model from the AEM inversion (AEM resistivity 804) is superimposed to the seismic data migrated in depth (PSDM seismic image 802). As illustrated, the AEM method describes the dunes and their base (BOS) with high resolution, which is unattainable using seismic methods alone. In the illustrated example, the results provide a clear indication of the benefits of the developed procedure and include velocity determinations within the dunes. The velocity determinations enable a robust reconstruction of seismic images to de-risk exploratory wells and augment the discovery success rate.

Figure 9:
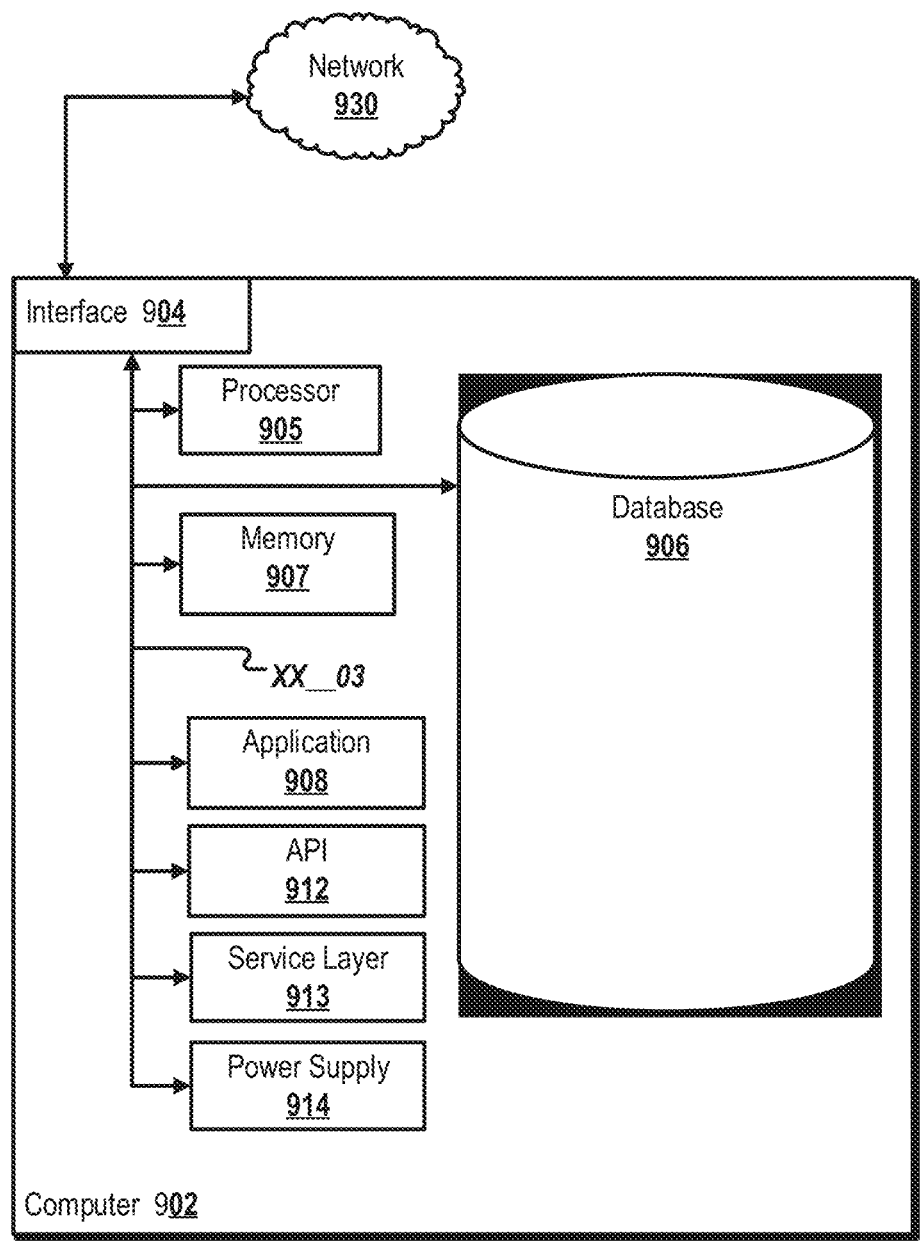
FIG. 9 is a block diagram illustrating an example of a computer-implemented system used to provide computational functionalities associated with described algorithms, methods, functions, processes, flows, and procedures, according to some implementations of the present disclosure.

FIG. 9 is a block diagram illustrating an example of a computer-implemented System 900 used to provide computational functionalities associated with described algorithms, methods, functions, processes, flows, and procedures, according to an implementation of the present disclosure. In the illustrated implementation, System 900 includes a Computer 902 and a Network 930.

The illustrated Computer 902 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 902 can include an input device, such as a keypad, keyboard, touch screen, another input device, or a combination of input devices that can accept user information, and an output device that conveys information associated with the operation of the Computer 902, including digital data, visual, audio, another type of information, or a combination of types of information, on a graphical-type user interface (UI) (or GUI) or other UI.

The Computer 902 can serve in a role in a distributed computing system as a client, network component, a server, a database or another persistency, another role, or a combination of roles for performing the subject matter described in the present disclosure. The illustrated Computer 902 is communicably coupled with a Network 930. In some implementations, one or more components of the Computer 902 can be configured to operate within an environment, including cloud-computing-based, local, global, another environment, or a combination of environments.

At a high level, the Computer 902 is an electronic computing device operable to receive, transmit, process, store, or manage data and information associated with the described subject matter. According to some implementations, the Computer 902 can also include or be communicably coupled with a server, including an application server, e-mail server, web server, caching server, streaming data server, another server, or a combination of servers.

The Computer 902 can receive requests over Network 930 (for example, from a client software application executing on another Computer 902) and respond to the received requests by processing the received requests using a software application or a combination of software applications. In addition, requests can also be sent to the Computer 902 from internal users (for example, from a command console or by another internal access method), external or third-parties, or other entities, individuals, systems, or computers.

Each of the components of the Computer 902 can communicate using a System Bus 903. In some implementations, any or all of the components of the Computer 902, including hardware, software, or a combination of hardware and software, can interface over the System Bus 903 using an application programming interface (API) 912, a Service Layer 913, or a combination of the API 912 and Service Layer 913. The API 912 can include specifications for routines, data structures, and object classes. The API 912 can be either computer-language independent or dependent and refer to a complete interface, a single function, or even a set of APIs. The Service Layer 913 provides software services to the Computer 902 or other components (whether illustrated or not) that are communicably coupled to the Computer 902. The functionality of the Computer 902 can be accessible for all service consumers using the Service Layer 913. Software services, such as those provided by the Service Layer 913, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 902, alternative implementations can illustrate the API 912 or the Service Layer 913 as stand-alone components in relation to other components of the Computer 902 or other components (whether illustrated or not) that are communicably coupled to the Computer 902. Moreover, any or all parts of the API 912 or the Service Layer 913 can be implemented as a child or a sub-module of another software module, enterprise application, or hardware module without departing from the scope of the present disclosure.

The Computer 902 includes an Interface 904. Although illustrated as a single Interface 904, two or more Interfaces 904 can be used according to particular needs, desires, or particular implementations of the Computer 902. The Interface 904 is used by the Computer 902 for communicating with another computing system (whether illustrated or not) that is communicatively linked to the Network 930 in a distributed environment. Generally, the Interface 904 is operable to communicate with the Network 930 and includes logic encoded in software, hardware, or a combination of software and hardware. More specifically, the Interface 904 can include software supporting one or more communication protocols associated with communications such that the Network 930 or hardware of Interface 904 is operable to communicate physical signals within and outside of the illustrated Computer 902.

The Computer 902 includes a Processor 905. Although illustrated as a single Processor 905, two or more Processors 905 can be used according to particular needs, desires, or particular implementations of the Computer 902. Generally, the Processor 905 executes instructions and manipulates data to perform the operations of the Computer 902 and any algorithms, methods, functions, processes, flows, and procedures as described in the present disclosure.

The Computer 902 also includes a Database 906 that can hold data for the Computer 902, another component communicatively linked to the Network 930 (whether illustrated or not), or a combination of the Computer 902 and another component. For example, Database 906 can be an in-memory, conventional, or another type of database storing data consistent with the present disclosure. In some implementations, Database 906 can be a combination of two or more different database types (for example, a hybrid in-memory and conventional database) according to particular needs, desires, or particular implementations of the Computer 902 and the described functionality. Although illustrated as a single Database 906, two or more databases of similar or differing types can be used according to particular needs, desires, or particular implementations of the Computer 902 and the described functionality. While Database 906 is illustrated as an integral component of the Computer 902, in alternative implementations, Database 906 can be external to the Computer 902. As illustrated, the Database 906 holds the previously described AEM data 916 and seismic data 918.

The Computer 902 also includes a Memory 907 that can hold data for the Computer 902, another component or components communicatively linked to the Network 930 (whether illustrated or not), or a combination of the Computer 902 and another component. Memory 907 can store any data consistent with the present disclosure. In some implementations, Memory 907 can be a combination of two or more different types of memory (for example, a combination of semiconductor and magnetic storage) according to particular needs, desires, or particular implementations of the Computer 902 and the described functionality. Although illustrated as a single Memory 907, two or more Memories 907 or similar or differing types can be used according to particular needs, desires, or particular implementations of the Computer 902 and the described functionality. While Memory 907 is illustrated as an integral component of the Computer 902, in alternative implementations, Memory 907 can be external to the Computer 902.

The Application 908 is an algorithmic software engine providing functionality according to particular needs, desires, or particular implementations of the Computer 902, particularly with respect to functionality described in the present disclosure. For example, Application 908 can serve as one or more components, modules, or applications. Further, although illustrated as a single Application 908, the Application 908 can be implemented as multiple Applications 908 on the Computer 902. In addition, although illustrated as integral to the Computer 902, in alternative implementations, the Application 908 can be external to the Computer 902.

The Computer 902 can also include a Power Supply 914. The Power Supply 914 can include a rechargeable or non-rechargeable battery that can be configured to be either user- or non-user-replaceable. In some implementations, the Power Supply 914 can include power-conversion or management circuits (including recharging, standby, or another power management functionality). In some implementations, the Power Supply 914 can include a power plug to allow the Computer 902 to be plugged into a wall socket or another power source to, for example, power the Computer 902 or recharge a rechargeable battery.

There can be any number of Computers 902 associated with, or external to, a computer system containing Computer 902, each Computer 902 communicating over Network 930. Further, the term "client," "user," or other appropriate terminology can be used interchangeably, as appropriate, without departing from the scope of the present disclosure. Moreover, the present disclosure contemplates that many users can use one Computer 902, or that one user can use multiple computers 902.

from the spirit and scope of the present disclosure.

Described implementations of the subject matter can include one or more features, alone or in combination.

For example, in a first implementation, a method includes receiving airborne electromagnetic AEM data and seismic data for a geographic region including sand dunes, wherein the AEM data identifies apparent resistivity as a function of depth within the sand dunes; executing an inversion with cross-domain regularization of the AEM data and the seismic data to generate a velocity-depth model, wherein the velocity depth model identifies velocity variations within the sand dunes; and generating a seismic image using the velocity-depth model.

The foregoing and other described implementations can each, optionally, include one or more of the following features:

A first feature, combinable with any of the following features, wherein executing the inversion with cross-domain regularization comprises minimizing a composite objective function formed by at least a data objective function and one or more cross-domain regularization objective functions.

A second feature, combinable with any of the previous or following features, wherein the minimization is based on one or more local optimizers including at least one of a steepest decent, a conjugated gradient, Gauss-Newton, or LBFGS.

A third feature, combinable with any of the previous or following features, wherein the minimization is based on one or more global optimizers including at least one of a neural network, a genetic algorithm, or a simulated annealing.

A fourth feature, combinable with any of the previous or following features, wherein the cross-domain regularization is based on a measure of similarity between the AEM data and the seismic data determined using at least one of cross correlation, linear regression, non-linear regression, or cluster analysis.

A fifth feature, combinable with any of the previous or following features, the method further comprising separately executing an inversion of the AEM data to generate a resistivity model; determining a base of sand BOS of the geographic region using the resistivity model; and further regularizing the inversion using the BOS.

A sixth feature, combinable with any of the previous or following features, the method further comprising filtering raw AEM data using decay rate filters to reduce interference from manmade EM sources; and generating the AEM data using the filtered raw AEM data.

A seventh feature, combinable with any of the previous or following features, wherein the inversion includes filtering parameters using spatially-varying lower bounds and spatially-varying upper bounds.

An eighth feature, combinable with any of the previous or following features, the method further comprising drilling a wellbore based on the seismic image.

In a second implementation, an apparatus comprising one or more processors; and a non-transitory computer-readable storage medium coupled to the one or more processors and storing programming instructions for execution by the one or more processors. The programming instructions instruct the one or more processors to: receive AEM data and seismic data for a geographic region including sand dunes, wherein the AEM data identifies apparent resistivity as a function of depth within the sand dunes; execute an inversion with cross-domain regularization of the AEM data and the seismic data to generate a velocity-depth model, wherein the velocity depth model identifies velocity variations within the sand dunes; and generate a seismic image using the velocity-depth model.

The foregoing and other described implementations can each, optionally, include one or more of the following features:

A first feature, combinable with any of the following features, wherein executing the inversion with cross-domain regularization comprises minimizing a composite objective function formed by at least a data objective function and one or more cross-domain regularization objective functions.

A second feature, combinable with any of the previous or following features, wherein the minimization is based on one or more local optimizers including at least one of a steepest decent, a conjugated gradient, Gauss-Newton, or LBFGS.

A third feature, combinable with any of the previous or following features, wherein the minimization is based on one or more global optimizers including at least one of a neural network, a genetic algorithm, or a simulated annealing.

A fourth feature, combinable with any of the previous or following features, wherein the cross-domain regularization is based on a measure of similarity between the AEM data and the seismic data determined using at least one of cross correlation, linear regression, non-linear regression, or cluster analysis.

A fifth feature, combinable with any of the previous or following features, the programming instructions further instruct the one or more processors to separately execute an inversion of the AEM data to generate a resistivity model; determining a base of sand (BOS) of the geographic region using the resistivity model; and further regularizing the inversion using the BOS.

A sixth feature, combinable with any of the previous or following features, the programming instructions further instruct the one or more processors to filter raw AEM data using decay rate filters to reduce interference from manmade EM sources; and generating the AEM data using the filtered raw AEM data.

A seventh feature, combinable with any of the previous or following features, wherein the inversion includes filtering parameters using spatially-varying lower bounds and spatially-varying upper bounds.

An eighth feature, combinable with any of the previous or following features, the method further comprising drilling a wellbore based on the seismic image.

In a third implementation, a non-transitory computer readable medium storing instructions to cause a processor to perform operations comprising: receiving airborne electromagnetic (AEM) data and seismic data for a geographic region including sand dunes, wherein the AEM data identifies apparent resistivity as a function of depth within the sand dunes; executing an inversion with cross-domain regularization of the AEM data and the seismic data to generate a velocity-depth model, wherein the velocity depth model identifies velocity variations within the sand dunes; and generating a seismic image using the velocity-depth model.

The foregoing and other described implementations can each, optionally, include one or more of the following features:

A first feature, combinable with any of the following features, wherein executing the inversion with cross-domain regularization comprises minimizing a composite objective function formed by at least a data objective function and one or more cross-domain regularization objective functions.

A second feature, combinable with any of the previous or following features, wherein the minimization is based on one or more local optimizers including at least one of a steepest decent, a conjugated gradient, Gauss-Newton, or LBFGS.

A third feature, combinable with any of the previous or following features, wherein the minimization is based on one or more global optimizers including at least one of a neural network, a genetic algorithm, or a simulated annealing.

A fourth feature, combinable with any of the previous or following features, wherein the cross-domain regularization is based on a measure of similarity between the AEM data and the seismic data determined using at least one of cross correlation, linear regression, non-linear regression, or cluster analysis.

A fifth feature, combinable with any of the previous or following features, the instructions to further cause a processor to perform operations comprising: separately executing an inversion of the AEM data to generate a resistivity model; determining a base of sand (BOS) of the geographic region using the resistivity model; and further regularizing the inversion using the BOS.

A sixth feature, combinable with any of the previous or following features, the instructions to further cause a processor to perform operations comprising: filtering raw AEM data using decay rate filters to reduce interference from manmade EM sources; and generating the AEM data using the filtered raw AEM data.

A seventh feature, combinable with any of the previous or following features, wherein the inversion includes filtering parameters using spatially-varying lower bounds and spatially-varying upper bounds.

An eighth feature, combinable with any of the previous or following features, the method further comprising drilling a wellbore based on the seismic image.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/–R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other. While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate. Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the implementation have been described. Nevertheless, it will be understood that various modifications may be made without departing from the spirit and scope of the implementation. Accordingly, other embodiments are within the scope of the following claims.

What is claimed is:

1. A method, comprising:
   receiving airborne electromagnetic (AEM) data and seismic data for a geographic region including sand dunes, wherein the AEM data identifies apparent resistivity as a function of depth within the sand dunes;
   separately calculating an inversion of the AEM data to generate a resistivity model;
   determining a base of sand (BOS) of the geographic region using the resistivity model;
   calculating an inversion with cross-domain regularization of the AEM data and the seismic data, wherein the cross-domain regularization comprises a cross-domain regularizer calculated from the resistivity model derived from the AEM data inversion and the velocity model derived from the seismic data inversion; using the determination of the BOS;
   generating a velocity-depth model based on the inversion with the cross-domain regularization between the resistivity and the velocity models, wherein the AEM data and the seismic data cover a common geographic region of the resistivity and the velocity models, wherein the velocity depth model identifies velocity variations within the sand dunes; and
   generating a seismic image using the velocity-depth model.

2. The method of claim 1, wherein calculating the inversion with cross-domain regularization comprises minimizing a composite objective function formed by at least a data objective function and one or more cross-domain regularization objective functions.

3. The method of claim 2, wherein the minimizing is based on one or more local optimizers including at least one of a steepest descent, a conjugated gradient, Gauss-Newton, or limited-memory Broyden-Fletcher-Goldfarb-Reeves (LBFGS).

4. The method of claim 2, wherein the minimizing is based on one or more global optimizers including at least one of a neural network, a genetic algorithm, or a simulated annealing.

5. The method of claim 1, wherein the cross-domain regularization is based on a measure of similarity between the AEM data and the seismic data determined using at least one of cross correlation, linear regression, non-linear regression, or cluster analysis.

6. The method of claim 1, further comprising:
filtering raw AEM data using decay rate filters to reduce interference from manmade EM sources; and
generating the AEM data using the filtered raw AEM data.

7. The method of claim 1, wherein the inversion includes filtering parameters using spatially-varying lower bounds and spatially-varying upper bounds.

8. The method of claim 1, further comprising communicating a location to drill a wellbore, the wellbore location being based upon the seismic image.

9. The method of claim 1, wherein further regularizing the inversion using the determination of the BOS comprises using logic comprising an electromagnetic skin-depth adaptive conical shaped regularization operator.

10. The method of claim 1, wherein further regularizing the inversion using the determination of the BOS comprises using an inversion sensitivity matrix to define the weighting of the regularization based on a shape of the BOS.

11. An apparatus, comprising:
one or more processors; and
a non-transitory computer-readable storage medium coupled to the one or more processors and storing programming instructions for execution by the one or more processors, the programming instructions instruct the one or more processors to:
receive airborne electromagnetic (AEM) data and seismic data for a geographic region including sand dunes, wherein the AEM data identifies apparent resistivity as a function of depth within the sand dunes;
separately calculating an inversion of the AEM data to generate a resistivity model;
determining a base of sand (BOS) of the geographic region using the resistivity model;
calculate an inversion with cross-domain regularization of the AEM data and the seismic data, wherein the cross-domain regularization comprises a cross-domain regularizer calculated from the resistivity model derived from the AEM data inversion and the velocity model derived from the seismic data inversion using the determination of the BOS;
generate a velocity-depth model based on the inversion, with the cross-domain regularization between the resistivity and the velocity models, wherein the AEM data and the seismic data cover a common geographic region of the resistivity and the velocity models, wherein the velocity depth model identifies velocity variations within the sand dunes; and
generate a seismic image using the velocity-depth model.

12. The apparatus of claim 11, wherein calculating the inversion with cross-domain regularization comprises minimizing a composite objective function formed by at least a data objective function and one or more cross-domain regularization objective functions.

13. The apparatus of claim 11, wherein the programming instructions instruct the one or more processors to:
filtering raw AEM data using decay rate filters to reduce interference from manmade EM sources; and
generating the AEM data using the filtered raw AEM data.

14. The apparatus of claim 11, wherein the inversion includes filtering parameters using spatially-varying lower bounds and spatially-varying upper bounds.

15. The apparatus of claim 11, further comprising communicating a location to drill a wellbore, the wellbore location being based upon the seismic image.

16. A non-transitory computer readable medium storing instructions to cause one or more processors to perform operations comprising:
receiving airborne electromagnetic (AEM) data and seismic data for a geographic region including sand dunes, wherein the AEM data identifies apparent resistivity as a function of depth within the sand dunes;
separately calculating an inversion of the AEM data to generate a resistivity model;
determining a base of sand (BOS) of the geographic region using the resistivity model;
calculating an inversion with cross-domain regularization of the AEM data and the seismic data, wherein the cross-domain regularization comprises a cross-domain regularizer calculated from the resistivity model derived from the AEM data inversion and the velocity model derived from the seismic data inversion; using the determination of the BOS;
generating a velocity-depth model based on the inversion with the cross-domain regularization between the resistivity and the velocity models, wherein the AEM data and the seismic data cover a common geographic region of the resistivity and the velocity models, wherein the velocity depth model identifies velocity variations within the sand dunes; and
generating a seismic image using the velocity-depth model.

17. The non-transitory computer readable medium of claim 16, wherein calculating the inversion with cross-domain regularization comprises minimizing a composite objective function formed by at least a data objective function and one or more cross-domain regularization objective functions.

18. The non-transitory computer readable medium of claim 16, wherein the instructions further cause the one or more processors to perform operations comprising:
filtering raw AEM data using decay rate filters to reduce interference from manmade EM sources; and
generating the AEM data using the filtered raw AEM data.

19. The non-transitory computer readable medium of claim 16, wherein the inversion includes filtering parameters using spatially-varying lower bounds and spatially-varying upper bounds.

* * * * *

UNITED STATES PATENT AND TRADEMARK OFFICE
CERTIFICATE OF CORRECTION

PATENT NO. : 10,920,585 B2
APPLICATION NO. : 15/854652
DATED : February 16, 2021
INVENTOR(S) : Colombo et al.

Page 1 of 1

It is certified that error appears in the above-identified patent and that said Letters Patent is hereby corrected as shown below:

In the Claims

In Column 22, Line 43, Claim 1, please replace "inversion;" with -- inversion --

In Column 24, Line 30, Claim 16, please replace "inversion;" with -- inversion --

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*